United States Patent
Pertuit et al.

(10) Patent No.: US 7,149,990 B2
(45) Date of Patent: Dec. 12, 2006

(54) ARCHITECTURE SPECIFIC CODE

(75) Inventors: Timothy Paul Pertuit, Allen, TX (US);
Nathan Dirk Zelle, Dallas, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 151 days.

(21) Appl. No.: 10/982,350

(22) Filed: Nov. 6, 2004

(65) Prior Publication Data

US 2006/0112378 A1    May 25, 2006

(51) Int. Cl.
*G06F 17/50* (2006.01)
(52) U.S. Cl. .......................................................... 716/5
(58) Field of Classification Search ................ 716/1–5, 716/18
See application file for complete search history.

(56) References Cited

U.S. PATENT DOCUMENTS

| | | | |
|---|---|---|---|
| 5,754,826 A * | 5/1998 | Gamal et al. ................. | 703/14 |
| 5,794,049 A | 8/1998 | Lindholm | |
| 5,889,990 A | 3/1999 | Coleman et al. | |
| 6,175,948 B1 * | 1/2001 | Miller et al. ................... | 716/7 |
| 2003/0110464 A1 * | 6/2003 | Davidson et al. ............. | 716/17 |

\* cited by examiner

*Primary Examiner*—Paul Dinh

(57) ABSTRACT

Exemplary techniques for utilizing architecture specific code are described. In a described embodiment, a method comprises storing architecture specific design verification code in a plurality of architecture specific code libraries. Each of the architecture specific code libraries corresponds to a select generation of architecture. The method further verifies a design of the select architecture by utilizing a corresponding architecture specific code library from the plurality of architecture specific code libraries and a non-architecture specific code library. The non-architecture specific code library corresponds to at least two different generations of the architecture.

22 Claims, 4 Drawing Sheets

ARCHITECTURE SPECIFIC CODE

TECHNICAL FIELD

The present description generally relates to electronic computing. More particularly, an embodiment relates to utilization of architecture specific code.

BACKGROUND

As integrated circuit (IC) fabrication technology improves, manufacturers are able to integrate additional functionality onto a single chip. Often, the additional functionality is introduced in a subsequent version of a same design. Maintaining data regarding various versions is a burdensome task.

A typical design process for ICs includes a front-end design phase and a back-end development phase. During the front-end phase, hardware engineers design and develop a logical representation of an IC from a set of specifications in the form of a schematic. The schematic is then loaded into a computer from which a circuit netlist is generated. The netlist defines the entire IC design including all components and interconnections.

The IC information may be developed using a hardware description language (HDL) and synthesis. With the aid of circuit simulation tools available on computers, a designer can then simulate the functionality of a given circuit. The circuit simulation process may involve several iterations of design modifications and improvements until the circuit design is finalized.

The back-end development involves several steps during which a final circuit layout (physical description) is developed based on the schematic design of the front-end phase. Various building blocks (or cells), as defined by the finalized circuit schematic, are placed within a predefined floor plan. The cells are then interconnected during a routing stage. After routing, the accuracy of the layout is verified against the schematic, and if no errors or design rule violations are found, the circuit layout information is used for the process of fabrication. The fabricated IC may be further verified to check for fabrication errors.

The use of computers substantially speeds up the verification process. However, when dealing with multiple versions of a design, maintaining the computer code for the verification process can still add substantial overhead to the process. For example, a different team may need to be assigned to each version of the design. Each team will then maintain the code assigned to that team. Coordinating these teams from both a technical and a timing perspective can be a challenging task. For example, if the teams are located in physically remote locations (e.g., in different time zones), additional planning and timing constraints can delay a successful design verification process. Furthermore, it is difficult to determine whether all bug fixes and enhancements have been applied to different design versions.

SUMMARY

In a described embodiment, a method comprises storing architecture specific design verification code in a plurality of architecture specific code libraries. Each of the architecture specific code libraries corresponds to a select generation of architecture. The method further verifies a design of the select architecture by utilizing a corresponding architecture specific code library from the plurality of architecture specific code libraries and a non-architecture specific code library. The non-architecture specific code library corresponds to at least two different generations of the architecture.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Exemplary techniques for utilization of architecture specific code are described. The techniques enable efficient reuse of code, for example, in subsequent projects and/or architectures.

In an embodiment, code is divided into different groups, and for subsequent projects and/or architectures a select portion of the code is updated. The different code groups may be stored in a hierarchical structure such as hierarchical code libraries. Such an approach provides a common location for storing related code, which enables more efficient maintenance of the code. Also, non-architecture specific code changes or enhancements (e.g., made to a subsequent generation) may be more readily applied to previous generations.

Architecture Specific Code Utilization Overview

Figure 1:
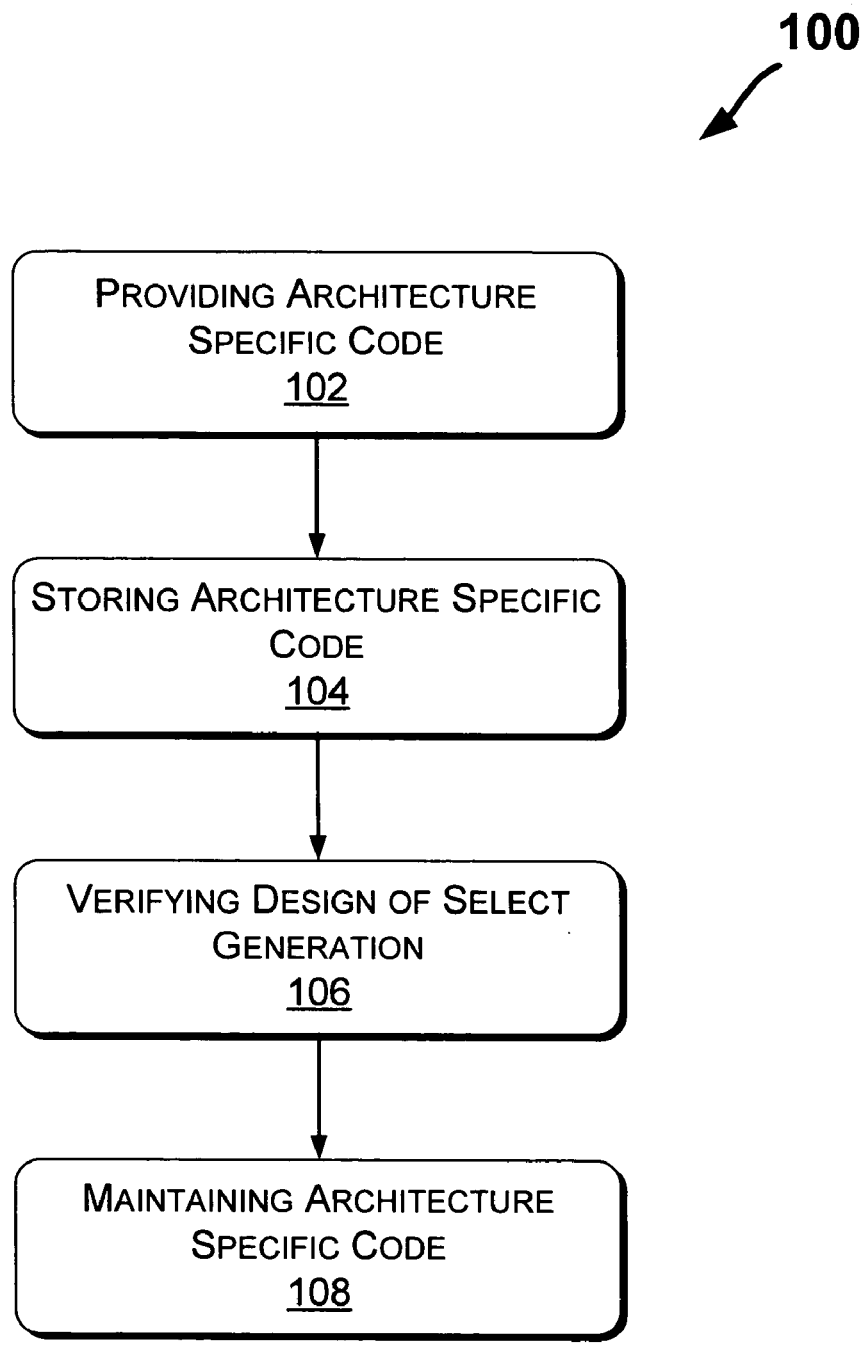
FIG. 1 illustrates an exemplary design verification method which utilizes architecture specific code libraries.

FIG. 1 illustrates an exemplary design verification method 100 which utilizes architecture specific code libraries. In an embodiment, the method 100 can be utilized to verify the design of an IC. It is envisioned that the method 100 may be applied to any case where at least a portion of code overlaps for different generations or versions of a design.

The design verification method 100 includes providing architecture specific code (102). The architecture specific code is stored in a plurality of architecture specific code libraries (104). Each of the architecture specific code libraries may correspond to a select generation of architecture and be stored a different directory structure. The directory structure can be a hierarchical directory structure in an embodiment.

The design of the select architecture is verified by utilizing a corresponding architecture specific code library from the plurality of architecture specific code libraries and a non-architecture specific code library (106). The non-architecture specific code library may be stored in a shared directory as will be further discussed with reference to FIG. 3. The non-architecture specific code library may correspond to at least two different generations of the architecture. Accordingly, the non-architecture specific code library includes data that may remain unchanged between the two different generations. Moreover, the non-architecture specific code library may be utilized to verify the at least two different generations of the architecture.

In an embodiment, the architecture specific design verification code is maintained in the plurality of architecture specific code libraries (108), as will be further discussed with reference to FIG. 3. The code maintenance may include one or more operations such as modifying, debugging, and updating the architecture specific design verification code.

The architecture specific code may include a reference to another architecture specific code library. Such an approach enables more efficient maintenance of the architecture specific code. For example, if changes are required, they may be made at a single location (e.g., main copy), and the changes will then be incorporated by way of the reference. Accordingly, for an object oriented implementation, the architecture specific code libraries may extend their class structure by including other class structure(s) from different architecture specific code libraries.

In one embodiment, an architecture specific code library corresponding to a next generation of the architecture includes data that has changed from a previous generation of the architecture. This enables the architecture specific code library to merely include data that has changed (or delta), which in turn simplifies code maintenance. Accordingly, it is envisioned that there may be three types of code libraries: entirely new code, delta code, and common code.

Code Provision

Figure 2:
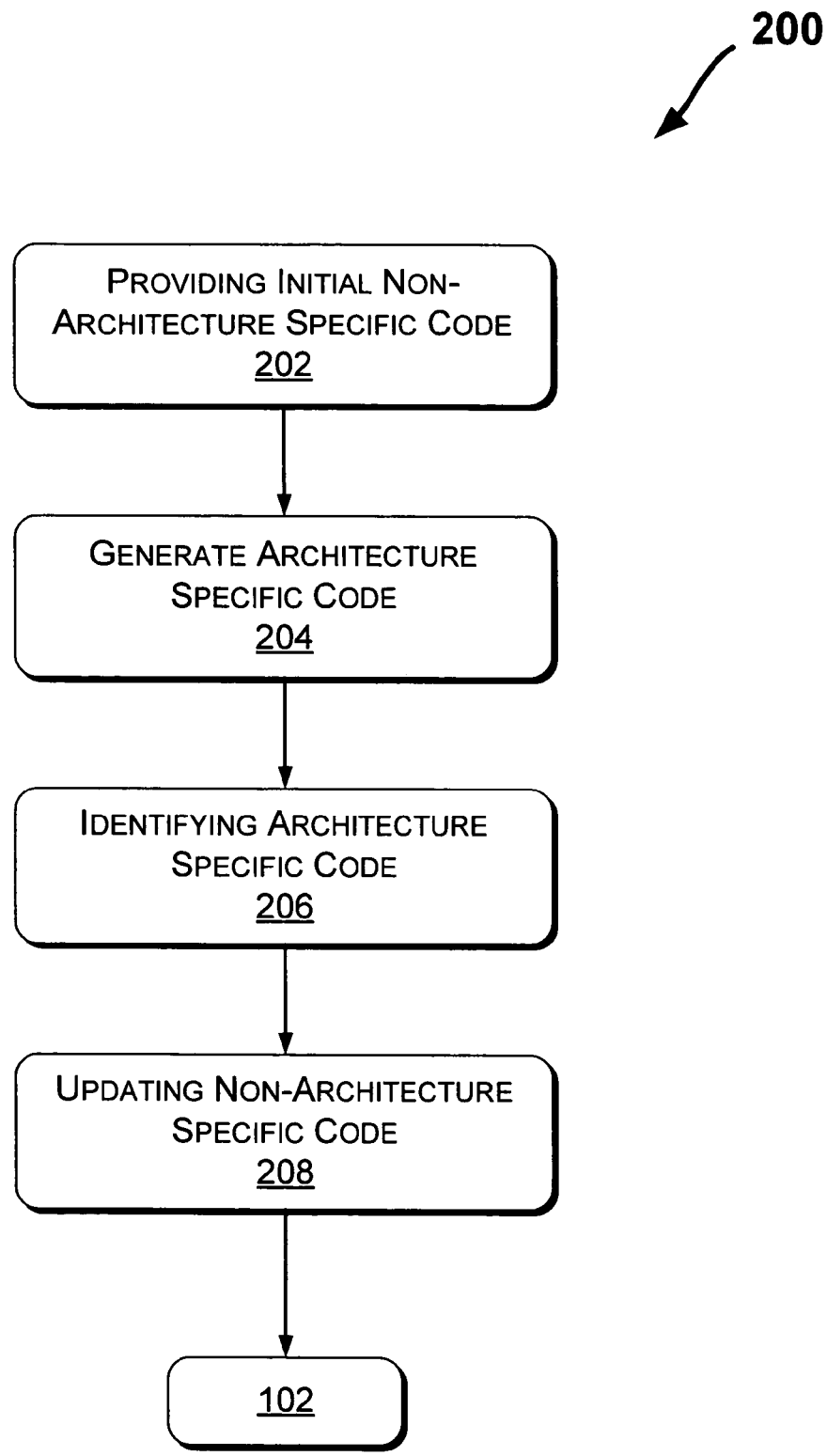
FIG. 2 illustrates an exemplary method which provides architecture specific and non-architecture specific code.

FIG. 2 illustrates an exemplary method 200 which provides architecture specific and non-architecture specific code. In an embodiment, the method 200 can be utilized to provide data that is manipulated by one or more stages of FIG. 1. The method 200 provides initial non-architecture specific code (202). The initial non-architecture specific code may be provided by a variety of sources such as non-architecture specific code of a previous design generation, combined non-architecture specific and architecture specific code of the previous design generation, and/or other code from previous or simultaneous designs.

As the design process progresses, architecture specific code is generated (204) which may differ from the initial non-architecture specific code. Once the architecture specific code is identified (206), the non-architecture specific code is updated (208) to exclude the portions that overlap with the newly generated architecture specific code. The non-architecture specific and architecture specific codes generated by the stages of FIG. 2 may be supplied to the stages of FIG. 1 to perform the design verification method 100. Accordingly, the method 200 may continue at the stage 102 of FIG. 1 in an embodiment. Also, as discussed with reference to FIG. 1, the architecture and non-architecture specific code may be stored in various code libraries.

Directory Structure

Figure 3:
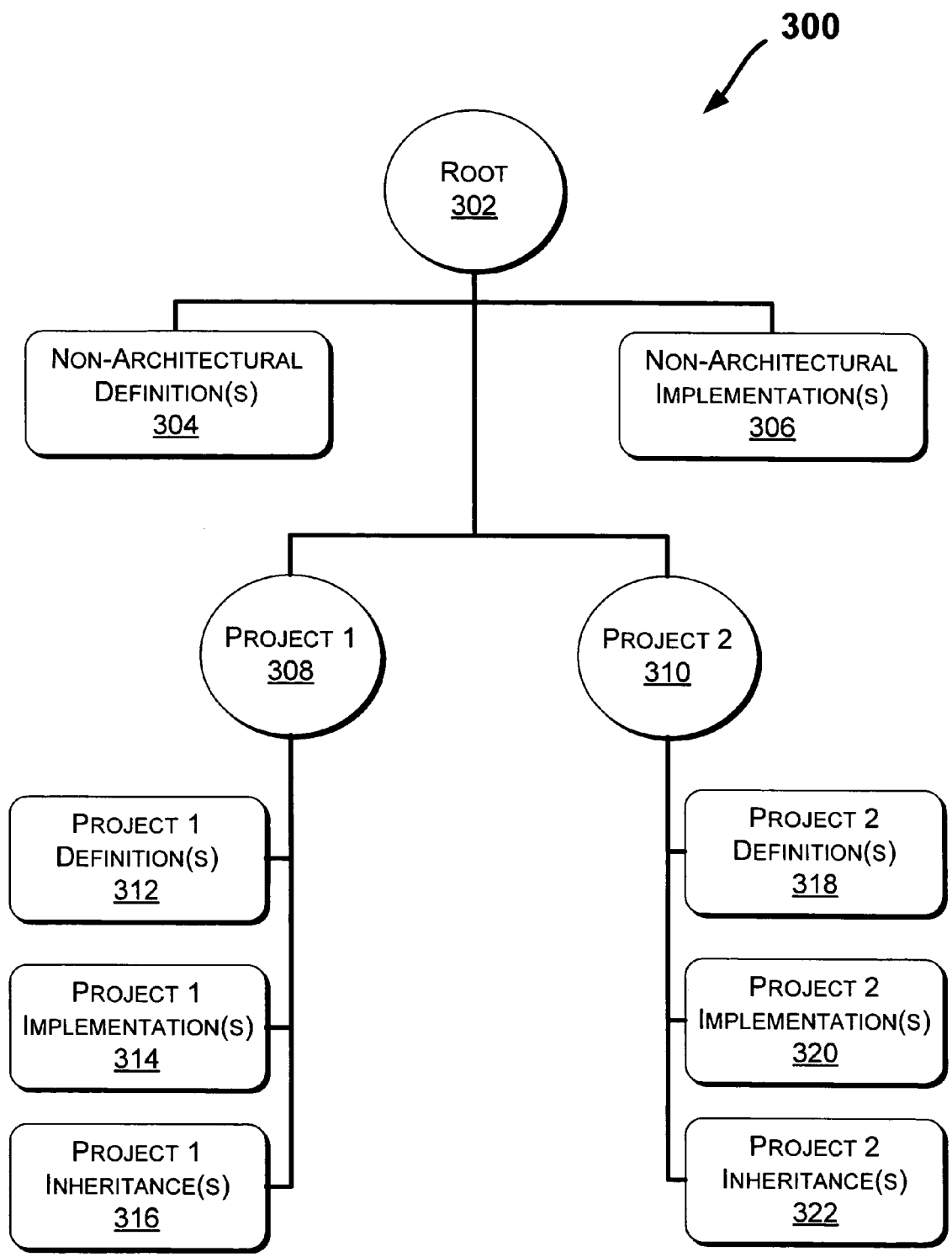
FIG. 3 illustrates an exemplary directory structure which may be utilized to store the data discussed herein.

FIG. 3 illustrates an exemplary directory structure 300 which may be utilized to store the data discussed herein. In an embodiment, the directory structure 300 is hierarchical. The directory structure 300 includes a root node 302. The root node 302 has access to non-architectural definition(s) 304 and implementation(s) 306 data. Such data may be stored in a single file or multiple files (or libraries). Also, the non-architectural data is envisioned to include data regarding features of a design that remains unchanged among different generations of the design.

The root node 302 is coupled to other nodes such as project 1 (308) and project 2 (310). It is envisioned that architecture specific data may be stored under these project specific nodes (308, 310, and so on). As illustrated in FIG. 3, each of the project nodes have access to architecture specific data stored in a single file or multiple files (or libraries) such as project 1 definition(s) 312, project 1 implementation(s) 314, project 1 inheritance(s) 316, project 2 definition(s) 318, project 2 implementation(s) 320, and project 2 inheritance(s) 322.

The definitions data may include class definitions and the implementations data may include the actual code used for the design at hand. Also, the definitions 312 and 318 may be architecture specific deltas (or extensions) to the definitions 304.

The inheritances data (e.g., 316 and 322) is envisioned to include data that indicates which definitions and/or implementations are to be inherited (if any). The inheritance may be implemented by including a reference (e.g., a header) to a parent data file which may be architecture specific. Accordingly, the class being extended may inherit from its designated parent, rather than recreating another copy of the architecture specific code.

Furthermore, delta changes may be made by utilizing at least two types of functions. First, a "delta function" may be used where a function is entirely architecture specific. Second, a "helper function" may be utilized where a common prototype exists which is architecture specific. As a result, the helper function may be called from non-architecture specific code (e.g., 306) and the delta function may be called from architecture specific code (e.g., 314 or 320).

Exemplary Computing Environment

Figure 4:
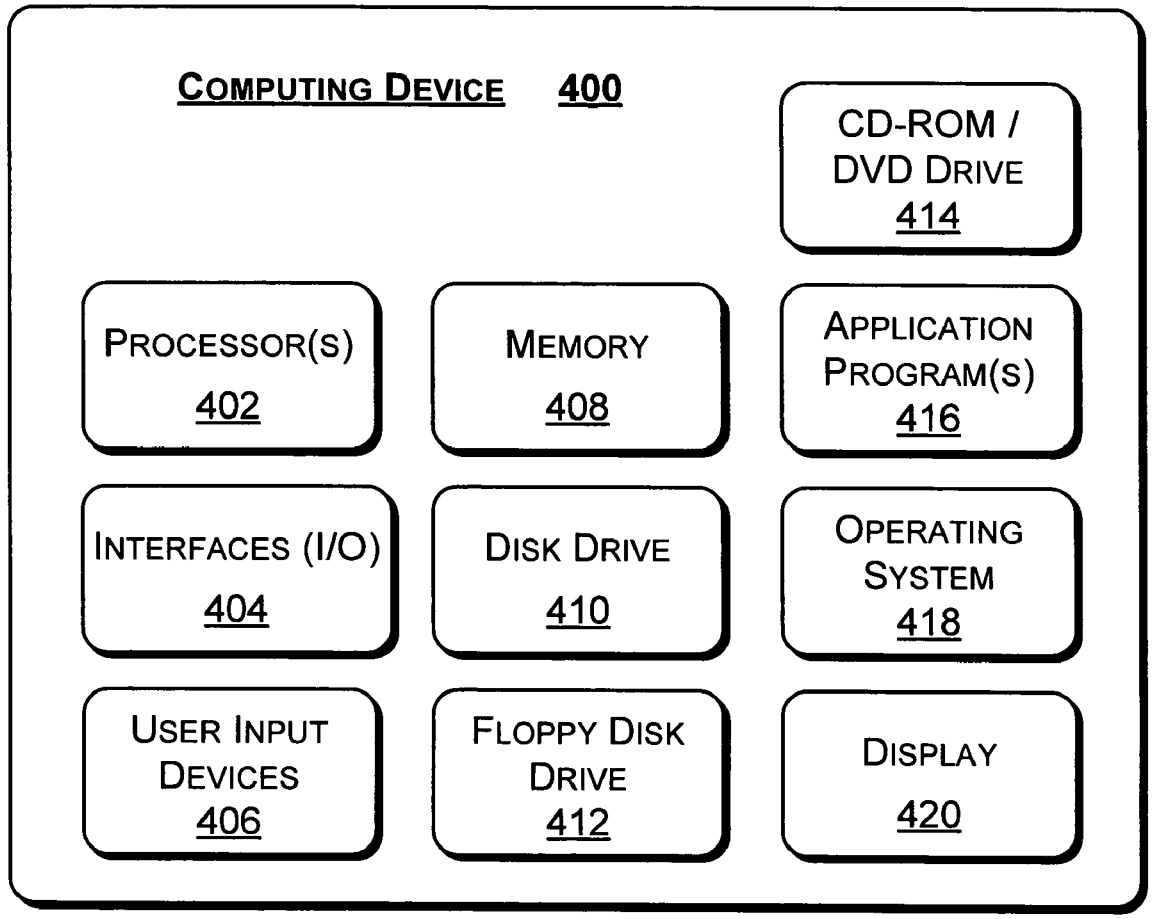
FIG. 4 illustrates various components of an exemplary computing device 400 which may be utilized to implement portions of the techniques discussed herein.

FIG. 4 illustrates various components of an exemplary computing device 400 which may be utilized to implement portions of the techniques discussed herein. In one embodiment, the computing device 400 can be used to perform the methods of FIGS. 1 and 2. The computing device 400 may also be used to store the directory structure of FIG. 3.

The computing device 400 includes one or more processor(s) 402 (e.g., microprocessors, controllers, etc.), input/output interfaces 404 for the input and/or output of data, and user input devices 406. The processor(s) 402 process various instructions to control the operation of the computing device 400, while the input/output interfaces 404 provide a mechanism for the computing device 400 to communicate with other electronic and computing devices. The user input devices 406 can include a keyboard, mouse, pointing device, and/or other mechanisms to interact with, and to input information to the computing device 400.

The input/output interfaces 404 can include serial, parallel, and/or network interfaces. A network interface allows devices coupled to a common data communication network to communicate information with the computing device 400. Similarly, a communication interface, such as a serial and/or parallel interface, a universal serial bus (USB) interface, an Ethernet interface, an Institute of Electrical & Electronics Engineers (IEEE) 802.11 interface, and/or any combination of wireless or wired communication interfaces provides a data communication path directly between the computing device 400 and another electronic or computing device.

The computing device 400 also includes a memory 408 (such as read-only memory (ROM) and/or random-access memory (RAM)), a disk drive 410, a floppy disk drive 412, and a compact disk read-only memory (CD-ROM) and/or digital video disk (DVD) drive 414, all of which provide data storage mechanisms for the computing device 400. Any number and combination of memory and storage devices can be connected with, or implemented within, the computing device 400. Although not shown, a system bus typically connects the various components within the computing device 400.

The computing device 400 also includes one or more application program(s) 416 and an operating system 418 which can be stored in non-volatile memory (e.g., the memory 408) and executed on the processor(s) 402 to provide a runtime environment in which the application program(s) 416 can run or execute. The computing device 400 can also include an integrated display device 420, such as for a PDA, a portable computing device, and any other mobile computing device.

Select embodiments discussed herein (such as those discussed with reference to FIGS. 1–3) may include various operations. These operations may be performed by hardware components or may be embodied in machine-executable instructions, which may be in turn utilized to cause a general-purpose or special-purpose processor, or logic circuits programmed with the instructions to perform the operations. Alternatively, the operations may be performed by a combination of hardware and software.

Moreover, some embodiments may be provided as computer program products, which may include machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other types of media or machine-readable medium suitable for storing electronic instructions and/or data. Moreover, data discussed herein may be stored in a single database, multiple databases, or otherwise in select forms (such as in a table).

Additionally, some embodiments discussed herein may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment is included in at least an embodiment. The appearances of the phrase "in one embodiment" in various places in the specification are not necessarily all referring to the same embodiment.

Thus, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention. For example, the techniques discussed herein may be applied to any case where at least a portion of code overlaps for different generations or versions of a design.

What is claimed is:

1. A method comprising:
   storing architecture specific design verification code corresponding to an architectural design of an integrated circuit device in a plurality of architecture specific code libraries, each of the architecture specific code libraries corresponding to a select version of the device; and
   verifying a design of the select version of the device by utilizing a corresponding architecture specific code library from the plurality of architecture specific code libraries and a non-architecture specific code library, the non-architecture specific code library corresponding to at least two different non-architectural design versions of the device.

2. The method of claim 1, wherein the non-architecture specific code library is utilized to verify the at least two different non-architectural design versions of the device.

3. The method of claim 1, further comprising maintaining the architecture specific design verification code in the plurality of architecture specific code libraries.

4. The method of claim 1, further comprising maintaining the architecture specific design verification code in the plurality of architecture specific code libraries, wherein the maintaining comprises one or more acts selected from a group comprising modifying, debugging, and updating the architecture specific design verification code.

5. The method of claim 1, wherein one of the plurality of architecture specific code libraries comprises a reference to another one of the plurality of architecture specific code libraries.

6. The method of claim 1, wherein an architecture specific code library corresponding to a next generation of the architecture comprises data that has changed from a previous generation of the architecture.

7. The method of claim 1, wherein inheritance is used to generate at least a portion of one or more of the architecture specific code libraries.

8. The method of claim 1, wherein one of the plurality of architecture specific code libraries extends its class structure by including another class structure from a different one of the plurality of architecture specific code libraries.

9. The method of claim 1, further comprising:
   providing an initial non-architecture specific code library;
   identifying generated architecture specific code; and
   updating the initial non-architecture specific code library to provide the non-architecture specific code library.

10. The method of claim 1, further comprising storing each of the plurality of architecture specific code libraries in a different directory structure.

11. The method of claim 1, further comprising storing the non-architecture specific code library in a shared directory.

12. The method of claim 1, further comprising storing each of the plurality of architecture specific code libraries in a hierarchical directory structure.

13. A system comprising:
   a processor; and
   one or more computer-readable media coupled to the processor and having instructions stored thereon that, when executed, perform acts comprising:
      storing architecture specific design verification code corresponding to an architectural design of an integrated circuit device in a plurality of architecture specific code libraries, each of the architecture specific code libraries corresponding to a select version of the device; and
      verifying a design of the select version of the device by utilizing a corresponding architecture specific code library from the plurality of architecture specific code libraries and a non-architecture specific code library, the non-architecture specific code library corresponding to at least two different non-architectural design versions of the device.

14. The system of claim 13, wherein the non-architecture specific code library is utilized to verify the at least two different non-architectural design versions of the device.

15. The system of claim 13, wherein the acts further comprise maintaining the architecture specific design verification code in the plurality of architecture specific code libraries, wherein the maintaining comprises one or more acts selected from a group comprising modifying, debugging, and updating the architecture specific design verification code.

16. The system of claim 13, wherein one of the plurality of architecture specific code libraries comprises a reference to another one of the plurality of architecture specific code libraries.

17. The system of claim 13, wherein inheritance is used to generate at least a portion of one or more of the architecture specific code libraries.

18. The system of claim 13, wherein the acts further comprise:

providing an initial non-architecture specific code library;

identifying generated architecture specific code; and updating the initial non-architecture specific code library to provide the non-architecture specific code library.

19. An apparatus comprising:

means for storing architecture specific design verification code corresponding to an architectural design of an integrated circuit device in a plurality of architecture specific code libraries; and means for verifying a design of a select version of the device by utilizing a corresponding architecture specific code and a non-architecture specific code library, wherein the non-architecture specific code library corresponds a plurality of different non-architectural design versions of the device.

20. The apparatus of claim 19, further comprising means for maintaining the architecture specific design verification code.

21. The apparatus of claim 19, further comprising means for storing each of the plurality of architecture specific code libraries in a different directory structure.

22. The apparatus of claim 19, further comprising means for storing the non-architecture specific code library in a shared directory.

* * * * *